United States Patent
Girgis

[19]

[11] Patent Number: 6,139,955
[45] Date of Patent: *Oct. 31, 2000

[54] COATED FIBER STRANDS REINFORCED COMPOSITES AND GEOSYNTHETIC MATERIALS

[75] Inventor: Mikhail M. Girgis, Wexford, Pa.

[73] Assignee: PPG Industris Ohio, Inc., Cleveland, Ohio

[ * ] Notice: This patent is subject to a terminal disclaimer.

[21] Appl. No.: 08/984,353

[22] Filed: Dec. 3, 1997

Related U.S. Application Data

[63] Continuation-in-part of application No. 08/852,893, May 8, 1997.

[51] Int. Cl.[7] .................................................. D02G 3/00
[52] U.S. Cl. ......................... 428/375; 428/378; 428/392; 428/395; 525/66; 525/129; 405/15; 405/16; 405/258
[58] Field of Search ................................. 428/375, 378, 428/392, 395; 525/66, 129; 405/15, 16, 258

[56] References Cited

U.S. PATENT DOCUMENTS

| | | | |
|---|---|---|---|
| 2,881,732 | 4/1959 | Chystman | 118/33 |
| 2,929,738 | 3/1960 | Bateson et al. | 117/103 |
| 3,014,453 | 12/1961 | Bateson et al. | 118/58 |
| 3,515,623 | 6/1970 | Bates | 161/86 |
| 3,755,009 | 8/1973 | Uffner | 117/126 GB |
| 3,844,821 | 10/1974 | Lanik | 117/72 |
| 3,869,308 | 3/1975 | Graham | 117/126 GB |
| 3,956,565 | 5/1976 | Bolen et al. | 428/378 |
| 4,062,145 | 12/1977 | Gidge | 47/9 |
| 4,090,325 | 5/1978 | Mushin et al. | 47/9 |

(List continued on next page.)

FOREIGN PATENT DOCUMENTS

| | | |
|---|---|---|
| 1217374 | 2/1987 | Canada . |
| 1240873 | 8/1988 | Canada . |
| 1338347 | 5/1996 | Canada . |
| 0199827A1 | 11/1986 | European Pat. Off. . |
| 0318707B1 | 5/1993 | European Pat. Off. . |
| 670389 | 6/1995 | European Pat. Off. . |
| 2713253 | 9/1995 | France . |
| 2753669 | 1/1978 | Germany . |
| 3-69532 | 3/1991 | Japan . |
| 5015602 | 1/1993 | Japan . |
| 617402 | 1/1994 | Japan . |
| 6-285942 | 10/1994 | Japan . |
| 1 362 280 | 8/1974 | United Kingdom . |
| WO98/08777 | 3/1998 | WIPO . |

OTHER PUBLICATIONS

Merriam Webster's Collegiate Dictionary, 10th edition.
"Impregnated Fiber Glass Yarns for Reinforcing Industrial Coated Fabrics", *Journal of Coated Fabrics* (Apr. 1988).
"Geotextiles Needlepunched Fabric to Reinforce Steep Slopes", *High Performance Textiles* (May 1997).
K. Miyata, "Walls Reinforced with Fiber Reinforced Geogrids in Japan", vol. 3, Geosynthetic Int'l, No. 1 (1996).
RD 240028, Apr. 10, 1984, (abstract).
"Strata Grid Case Study Byrd Park Lakefront Retaining Wall", Product Bulletin of Strata Systems, Inc. (1994).
"Constructing a Reinforced Soil Wall with STRATAGRID and Segimental Facing", Technical Bulletin GS 105 of Strata Systems, Inc. (1994).

(List continued on next page.)

*Primary Examiner*—William Krynski
*Assistant Examiner*—B. Shewareged
*Attorney, Agent, or Firm*—Andrew G. Siminerio; Ann Marie Cannoni

[57] ABSTRACT

The present invention provides a fiber strand useful in composites and geosynthetics which includes a plurality of fibers having applied to at least a portion of surfaces thereof a base layer of a base coating composition and thereupon a principal layer of an aqueous coating composition different from the base coating composition, the aqueous coating composition including a blend of (1) a halogenated vinyl polymer and (2) an elastomeric polymer, the blend being essentially free of a monoolefinic material.

16 Claims, 2 Drawing Sheets

U.S. PATENT DOCUMENTS

| | | | |
|---|---|---|---|
| 4,374,798 | 2/1983 | Mercer | 264/288.8 |
| 4,390,647 | 6/1983 | Girgis | 523/212 |
| 4,421,439 | 12/1983 | ter Burg et al. | 405/258 |
| 4,472,086 | 9/1984 | Leach | 405/258 |
| 4,491,617 | 1/1985 | O'Connor et al. | 428/236 |
| 4,539,254 | 9/1985 | O'Connor et al. | 428/236 |
| 4,540,311 | 9/1985 | Leach | 404/72 |
| 4,610,568 | 9/1986 | Koerner | 405/19 |
| 4,619,854 | 10/1986 | Penttinen | 428/99 |
| 4,662,946 | 5/1987 | Mercer | 106/281 R |
| 4,663,231 | 5/1987 | Girgis et al. | 428/378 |
| 4,699,542 | 10/1987 | Shoesmith | 404/82 |
| 4,756,946 | 7/1988 | Mercer | 428/136 |
| 4,762,744 | 8/1988 | Wolceshyn et al. | 428/219 |
| 4,762,750 | 8/1988 | Girgis et al. | 428/378 |
| 4,762,751 | 8/1988 | Girgis et al. | 428/378 |
| 4,780,350 | 10/1988 | O'Connor et al. | 428/109 |
| 4,790,691 | 12/1988 | Freed | 405/263 |
| 4,795,678 | 1/1989 | Girgis | 428/391 |
| 4,837,387 | 6/1989 | van de Pol | 428/229 |
| 4,851,277 | 7/1989 | Valkenburg et al. | 428/167 |
| 4,867,614 | 9/1989 | Freed | 405/263 |
| 4,916,855 | 4/1990 | Halliday et al. | 47/88 |
| 4,957,390 | 9/1990 | Shoesmith | 404/18 |
| 4,960,349 | 10/1990 | Willibey et al. | 405/262 |
| 4,990,390 | 2/1991 | Kawasaki et al. | 428/113 |
| 5,007,766 | 4/1991 | Freed et al. | 405/24 |
| 5,091,247 | 2/1992 | Willibey et al. | 428/255 |
| 5,110,627 | 5/1992 | Shoesmith et al. | 427/208.4 |
| 5,156,495 | 10/1992 | Mercer | 405/262 |
| 5,187,004 | 2/1993 | Risseeuw | 428/229 |
| 5,197,202 | 3/1993 | Jensen | 34/23 |
| 5,226,255 | 7/1993 | Robertson | 47/56 |
| 5,246,306 | 9/1993 | Shoesmith et al. | 404/70 |
| 5,249,893 | 10/1993 | Romanek et al. | 405/258 |
| 5,344,470 | 9/1994 | Molnar et al. | 47/58 |
| 5,358,356 | 10/1994 | Romanek et al. | 405/16 |
| 5,393,559 | 2/1995 | Shoesmith et al. | 427/136 |
| 5,401,118 | 3/1995 | Kramer | 405/129 |
| 5,419,659 | 5/1995 | Mercer | 405/258 |
| 5,439,726 | 8/1995 | Wolceshyn | 428/109 |
| 5,447,389 | 9/1995 | Olson | 405/129 |
| 5,466,528 | 11/1995 | Girgis | 428/391 |
| 5,507,845 | 4/1996 | Molnar et al. | 47/1.01 |
| 5,552,207 | 9/1996 | Porter et al. | 428/109 |
| 5,555,674 | 9/1996 | Molnar et al. | 47/56 |
| 5,567,087 | 10/1996 | Theisen | 405/258 |
| 5,646,207 | 7/1997 | Schell | 524/47 |
| 5,651,641 | 7/1997 | Stephens et al. | 405/258 |
| 5,669,796 | 9/1997 | Harford | 442/220 |
| 5,824,413 | 10/1998 | Schell | 428/378 |
| B1 5,156,495 | 8/1994 | Mercer | 405/262 |

OTHER PUBLICATIONS

"In Soil Characteristics and Interface Properties of STRATA GRID 9027", Technical Bulletin GS 101 of Strata Systems, Inc.

C. Fuller et al, "Constructing a Geogrid–Reinforced Rail Embankment", Geotechnical Fabrics Report (Jan./Feb. 1996).

"Design Strength Calculations for STRATAGRID Products", Technical Bulletin GS 300 of Strata systems, Inc. (1994).

"A Better Way to Build", Technical Bulletin of Strata Systems, Inc. (1994).

Textile Terms and Definitions, The Textile Institute (9th Ed. 1991), pp. 35–36.

"StrataGrid® 300", Technical Bulletin of Strata Systems, Inc.

"Product Data StrataGrid®", Technical Bulletin of Strata Systems, Inc. (Jun. 6, 1996).

StrataGrid® 100, Technical Bulletin of Strata Systems, Inc.

"High Performance Emulsions for Nonwovens", Technical Bulletin of B.F. Goodrich (1995).

"StrataGrid® 200, 500 & 600".

"HERCUFLEX® STRAND: The Applications are Endless", Technical Bulletin of PPG Industries, Inc. (about 1990).

M. Girgis, "Impregnated Fiber–Glass Yarn for High Strength Geosynthetic Reinforcement", American Chemical Society (1991).

I. Rubin, Handbook of Plastic Materials and Technology, (1990), pp. 955–1062, 1179–1215, 1225–1271.

Encyclopedia of Polymer Science and Technology, (1967), vol. 6, pp. 505–712, vol. 14, pp. 313–316, 347–350, 353–357; 396–397; vol. 2 (1965), pp. 703–706.

K. Loewenstein, The Manufacturing Technology of Glass Fibers, (3d, Ed. 1993), pp. 25, 30–44, 47–60, 115–122, 126–135, 237–289, 165–172, 219,222.

Kirk–Othmer, Encyclopedia of Chemical Technology, vol. 1 (1963), pp. 203–205, 259–297, 305–307; vol. 21 (2d Ed. 1970) pp. 56–69, 369–377, 379; vol. 7 (1965) pp. 676, 679–686, 693–698; vol. 17 (1968) pp. 543–544.

PN–3716–K and PN–3716–L1, Technical Data Sheets of H.B. Fuller Co. (Jul. 25, 1994).

"Building Better Nonwovens", Technical Bulletin of Rohm and Haas Specialty Industrial Polymers (1994).

Hawley's Condensed Chemical Dictionary (12th Ed 1993), pp. 157, 331, 435, 455, 461, 851–852, 1215–1216, 942, 288, 1075.

"Vycar™ Polyvinyl Chloride Emulsions" Technical Bulletin of B.F. Goodrich Co. (May 1994), pp. 2, 13–17.

"Textile Polymers and Chemicals Product Selection Guide", Technical Bulletin of B.F. Goodrich Co. (May 1995), pp. 7–8.

"B.F. Goodrich Emulsion Polymer Selection Guide", Technical Bulletin of B.F. Goodrich (1994).

"Technical Data VYCAR™ 352", Technical Bulletin of B.F. Goodrich Co. (Aug. 1994).

"Technical Data VYCAR™ 580X83", Technical Bulletin of B. F. Goodrich Co. (Aug. 1995), pp. 7–8.

"Technical Data VYCAR™ 552", Technical Bulletin of B.F. Goodrich (Aug. 1994).

B. Das, Principles of Geotechnical Engineering, (3d Ed. 1994) p. 7.

"A New Concept . . . In Soil Reinforcement Strata PEC", Technical Bulletin of Strata Systems, Inc. (1997).

"Strata PEC Product Data", Technical Bulletin of Strata Systems, Inc.

"Geotextiles Knitted Biodegradable Geogrid", International Newletters (1997) p. 11.

D. Gray et al, "Behavior of Fabric–Versus Fiber–Reinforced Sand", Journal of Geotechnical Engr., vol. 112, No. 8 (Aug. 1986), pp. 804–821.

COATED FIBER STRANDS REINFORCED COMPOSITES AND GEOSYNTHETIC MATERIALS

CROSS REFERENCE TO RELATED APPLICATIONS

This patent application is a continuation-in-part of U.S. patent application Ser. No. 08/852,893 filed May, 8, 1997 of Mikhail M. Girgis entitled "COATINGS FOR STRANDS, COATED FIBER STRANDS, REINFORCED COMPOSITES, ASSEMBLIES AND METHOD OF REINFORCING THE SAME" which is a continuation-in-part of U.S. Pat. application Ser. No. 08/697,758 of Mikhail M. Girgis entitled "COATINGS FOR FIBER STRANDS, COATED FIBER STRANDS, REINFORCED COMPOSITES, ASSEMBLIES AND METHOD OF REINFORCING THE SAME", now abandoned and is related to U.S. patent application Ser. No. 08/984,283 of John N. Paulson et al entitled "NOVEL FIBER GLASS BASED GEOSYNTHETIC MATERIAL", filed concurrently with the present application.

FIELD OF THE INVENTION

This invention relates generally to coated fiber strands for use in geosynthetic materials and reinforcing polymeric composites and, more specifically, to fiber strands coated with a blend of one or more halogenated vinyl polymers and one or more elastomeric polymers to provide flexibility to geosynthetic materials and compatibility and adhesion to polymeric composite matrices.

BACKGROUND OF THE INVENTION

Reinforced composites and geosynthetic materials are often subjected to bending, twisting and physical environments which can cause deterioration of the reinforcement materials and separation of the reinforcement and composite matrix. Coatings on the reinforcement material can promote adhesion and compatibility between the reinforcement and the adjacent composite matrix.

U.S. Pat. No. 4,663,231 discloses an aqueous impregnating coating composition for glass fibers which includes an aqueous soluble, dispersible or emulsifiable elastomeric ethylene-containing interpolymer which has a glass transition temperature of around 0° C. or less (see column 4, lines 38–54); one or more crosslinkable materials; a crosslinking controlling agent; wax, a plasticizer and a diene-containing elastomeric polymer.

U.S. Pat. No. 4,762,750 discloses an aqueous impregnating coating composition for glass fibers which includes an aqueous soluble, dispersible or emulsifiable elastomeric polymer that is essentially free of any hydrocarbon diene functionality and essentially free of any chlorine functionality (see column 5, lines 58–63), such as elastomeric ethylene-containing interpolymers having a glass transition temperature of around 0° C. or less (see column 6, lines 21–38), elastomeric polyurethanes, elastomeric silicones, fluororubbers, polysulfide rubbers, ethylene-propylene rubber or polyethers; a crosslinking material; and optionally a wax, plasticizer and diene-containing elastomeric polymer.

Coated fibers are needed which provide polymeric composites and geosynthetic materials having good flexibility, tensile strength and modulus, low creep, good alkali and acid resistance, and low sensitivity to ultraviolet radiation and the biological and chemical environments in which such fibers are used.

SUMMARY OF THE INVENTION

The present invention provides a fiber strand comprising a plurality of fibers having applied to at least a portion of surfaces thereof a base layer of a base coating composition and thereupon a principal layer of an aqueous coating composition different from the base coating composition, the aqueous coating composition comprising a blend of (1) a halogenated vinyl polymer and (2) an elastomeric polymer, the blend being essentially free of a monoolefinic material.

Another aspect of the present invention is a fiber strand comprising a plurality of fibers having applied to at least a portion of surfaces thereof a base layer of a base coating composition and thereupon a principal layer of an aqueous coating composition different from the base coating composition, the aqueous coating composition consisting of a blend of (1) a halogenated vinyl polymer and (2) an elastomeric polymer, the blend being essentially free of a monoolefinic material.

Yet another aspect of the present invention is a fiber strand comprising a plurality of fibers having applied to at least a portion of surfaces thereof (1) a sublayer of a sizing composition, (2) thereupon a base layer of a base coating composition different from the sizing composition, and (3) thereupon a principal layer of an aqueous coating composition different from the base coating composition, the aqueous coating composition comprising a blend of (a) a halogenated vinyl polymer; and (b) an elastomeric polymer.

Another aspect of the present invention is a reinforced polymeric composite comprising: (a) a fiber strand reinforcing material comprising a plurality of fibers having applied to at least a portion of surfaces thereof a base layer of a base coating composition and thereupon a principal layer of an aqueous coating composition comprising a blend of (1) a halogenated vinyl polymer; and (2) an elastomeric polymer, the blend being essentially free of a monoolefinic material; and (b) a polymeric matrix material.

Another aspect of the present invention is a geosynthetic material comprising a fiber strand of a plurality of fibers having applied to at least a portion of surfaces thereof a base layer of a base coating composition and thereupon a principal layer of an aqueous coating composition different from the base coating composition, the aqueous coating composition comprising a blend of (1) a halogenated vinyl polymer and (2) an elastomeric polymer.

Yet another aspect of the present invention is a geosynthetic material comprising: (a) a first layer comprising a first plurality of generally parallel, spaced apart fiber strands; (b) a second layer comprising a second plurality of generally parallel, spaced apart fiber strands, at least a portion of the strands of the first layer being positioned to form a plurality of intersections with corresponding strands of the second layer; and (c) a bonding agent adhering predetermined regions of selected fiber strands of the first plurality of fiber strands with predetermined regions of selected fiber strands of the second plurality of fiber strands at intersections thereof, the bonding agent comprising a blend of (1) a halogenated vinyl polymer and (2) an elastomeric polymer.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE INVENTION

The coated fiber strands of the present invention are useful for reinforcing polymeric composites, providing adhesion and compatibility between the reinforcement and adjacent polymeric matrix materials. Geosynthetic materials including the coated fiber strands of the present invention exhibit good flexibility, tensile strength and modulus, alkali and acid resistance and low sensitivity to ultraviolet radiation.

Figure 1:
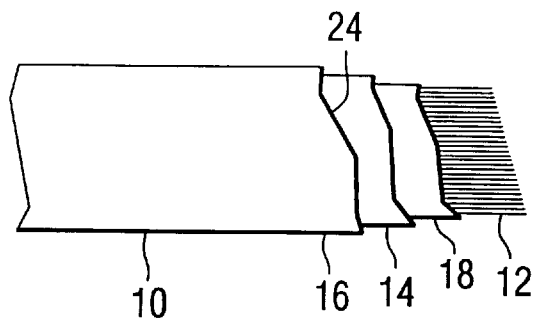
FIG. 1 is an enlarged front elevational view of a strand comprising a plurality of fibers having applied thereto a sublayer of a sizing composition, a base layer of a base coating composition and a principal layer of an aqueous coating composition according to the present invention.
Figure 2:
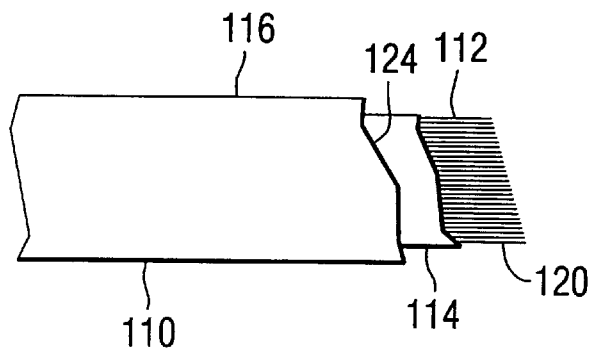
FIG. 2 is an enlarged front elevational view of a strand comprising a plurality of fibers having applied thereto a base layer of a base coating composition and a principal layer of an aqueous coating composition according to the present invention.

Referring to the drawings, wherein like numerals indicate like elements throughout, there are shown FIGS. 1 and 2 preferred embodiments of fiber strands 10, 110 of the present invention. Each fiber strand 10, 110 comprises a plurality of individual filaments or fibers 12, 112. At least a portion of the fibers 12, 112 are coated with a base layer 14, 114 of a base coating composition and thereupon a principal layer 16, 116 of an aqueous coating composition.

In the preferred embodiment shown in FIG. 1, the base layer 14 is a secondary coating applied over at least a portion of a sublayer 18 of the essentially dried residue of a sizing composition. In an alternative embodiment shown in FIG. 2, the base layer 114 is applied directly to at least a portion of the surfaces 120 of the fibers 112, which will be discussed in detail below.

The principal layer 16, 116 of an aqueous coating composition is applied over at least a portion 24, 124 of the base layer 14, 114. In the preferred embodiment, the principal layer 16 is a tertiary coating. In the alternative embodiment shown in FIG. 2, the principal layer 116 is a secondary coating.

The aqueous coating composition of the principal layer 16, 116 is different from the base coating composition, i.e., the aqueous coating composition (1) contains at least one component which is chemically different from the components of the base coating composition; or (2) contains at least one component in an amount which is different from the amount of the same component contained in the base coating composition. For example, the aqueous coating composition can contain an acrylonitrile-butadiene copolymer as an elastomeric material and the base coating composition can contain a chemically different elastomeric material such as a styrene-butadiene copolymer. In another example, the aqueous coating composition and base coating composition can each contain the same elastomeric material but in different amounts.

Broadly stated, the aqueous coating composition of the principal layer 16, 116 includes one or more components which are water soluble, emulsifiable or dispersible. The components of the aqueous coating composition can also be curable.

As used herein, the term "water soluble" means that any of the components of the aqueous coating composition are capable of being essentially uniformly blended and/or molecularly or ionically dispersed in water to form a true solution. See *Hawley's Condensed Chemical Dictionary*, (12th Ed. 1993) at page 1075, which is hereby incorporated by reference.

The term "emulsifiable" as used herein means that any of the components of the aqueous coating composition are capable of forming an essentially stable mixture or being suspended in water in the presence of an emulsifying agent. See *Hawley's* at page 461, which is hereby incorporated by reference. Non-limiting examples of suitable emulsifying agents are set forth below.

The term "dispersible" means that any of the components of the aqueous coating composition are capable of being distributed throughout water as finely divided particles, such as a latex. See *Hawley's* at page 435, which is hereby incorporated by reference. The uniformity of the dispersion can be increased by the addition of wetting, dispersing or emulsifying agents (surfactants), which are discussed below.

As used herein, the term "curable" means (1) any of the components of the aqueous coating composition are capable of being at least partially dried by air and/or heat; and/or (2) any of the components of the aqueous coating composition, components of the base coating composition and/or fibers are capable of being crosslinked to each other to change the physical properties of the component of the aqueous coating composition. See *Hawley's* at page 331, which is hereby incorporated by reference.

The aqueous coating composition of the principal layer comprises a blend of (1) one or more halogenated vinyl polymers; and (2) one or more elastomeric polymers, the blend being essentially free of a monoolefinic material. As used herein, the terms "blend" or "polyblend" mean a uniform combination of (a) one or more halogenated vinyl polymers and (b) one or more elastomeric polymers. See *Hawley's* at page 157, which is hereby incorporated by reference.

The halogenated vinyl polymer can be a homopolymer, copolymer or multipolymer formed by the polymerization of one or more types of halogenated vinyl monomers or preformed copolymers of the halogenated vinyl monomers. Non-limiting examples of preferred halogenated vinyl monomers for forming the halogenated vinyl polymer include vinyl chloride, vinyl fluoride, vinylidene chloride, vinylidene fluoride and mixtures thereof. Vinyl monomers of other halogens of group VIIA of the Periodic Table, such as bromine, iodine, astatine and mixtures thereof, can also be used. As used herein, the term "mixture" means a heterogeneous association of substances which cannot be represented by a single chemical formula and which may or may not be uniformly dispersed and can usually be separated by mechanical means. See *Hawley's* at page 788–789, which are hereby incorporated by reference.

Examples of polymerization methods for forming the halogenated vinyl polymer(s) from the halogenated vinyl monomer(s) include bulk polymerization in the presence of a free radical initiator, emulsion polymerization, suspension polymerization and solution and precipitation polymerization. For information regarding methods for forming and polymerizing halogenated vinyl monomers, see *Hawley's Condensed Chemical Dictionary*, (12th Ed. 1993) at pages 1215–1216, *Encyclopedia of Polymer Science and Technology,* (1971) Volume 14 at pages 313–316 and Kirk-Othmer, *Encyclopedia of Chemical Technology,* (2d Ed. 1970) Volume 21 at pages 369–377, which are hereby incorporated by reference.

Examples of suitable halogenated vinyl polymers include polyvinyl chloride, polyvinyl fluoride, vinylidene chloride, vinylidene fluoride, mixtures thereof and copolymers thereof. Preferably, the halogenated vinyl polymer is polyvinyl chloride or a copolymer of polyvinyl chloride and vinylidene chloride.

Such polymers can be emulsified with any conventional emulsifier well known to those skilled in the art and such as are discussed below. Non-limiting examples of useful emulsified halogenated vinyl polymers include VYCAR™ 351, 352, 460X95, 575X43, 576, 577, 580X83, 580X158, 580X175, 590X4 vinyl chloride polymer and copolymer emulsions and VYCAR™ 650X18 and 660X14 vinylidene chloride copolymer emulsions, which are commercially available from B.F. Goodrich.

For example, VYCAR™ 352 vinyl chloride copolymer emulsion has a glass transition temperature of about +69° C., a specific gravity of 1.16, a pH of about 10.3 to about 10.5, a surface tension of about 39 dynes per centimeter, a Brookfield LVF viscosity of about 20 centipoise at 25° C. using Spindle No.1 at 60 revolutions per minute (rpm), an average total solids of about 57 weight percent and includes an anionic emulsifier, according to the supplier.

Another example of a useful vinyl chloride copolymer emulsion is VYCAR™ 580X83, which is plasticized with di-isodecyl phthalate and has a glass transition temperature of about +17° C., a specific gravity of 1.14, a pH of about 10.0, a surface tension of about 35 dynes per centimeter, a Brookfield viscosity of about 30 centipoise at 25° C. using Spindle No. 2 at 60 rpm, an average total solids of about 56 weight percent and also includes an anionic emulsifier, according to the supplier.

For more information regarding useful commercially available halogenated vinyl polymers, see "VYCAR™ Polyvinyl Chloride Emulsions", a Technical Bulletin of B.F. Goodrich Company (May 1994) at pages 2 and 13–17; "Textile Polymers and Chemicals Product Selection Guide" A Technical Bulletin of B.F. Goodrich Co. (May 1995) at pages 7–8; "B.F. Goodrich Emulsion Polymer Selection Guide", a Technical Bulletin of B.F. Goodrich Co. (1994); "Technical Data VYCAR™ 352", a Technical Bulletin of B.F. Goodrich Co. (August 1994); and "Technical Data VYCAR™ 580X83", a Technical Bulletin of B.F. Goodrich (August 1994), which are hereby incorporated by reference.

Other materials which can be copolymerized with the halogenated vinyl polymer include vinyl esters such as vinyl acetate, acrylic esters such as methyl acrylate, ethyl acrylate and n-butyl acrylate, vinyl ethers such as cetyl vinyl ether or lauryl vinyl ether and maleic and fumaric esters. For more information, see *Encyclopedia of Polymer Science and Technology,* (1971) Volume 14 at pages 347–350 and 353–357, which are hereby incorporated by reference.

One or more plasticizers for the halogenated vinyl polymer can be included in the aqueous coating composition. Non-limiting examples of suitable plasticizers include phthalates (such as di-isodecyl phthalate, a preferred plasticizer, di-2-ethyl hexyl phthalate, diisooctyl phthalate); phosphates (such as trixylyl phosphate and tricresyl phosphate); esters of aliphatic dibasic acids (adipates such as dioctyl adipate); polyesters; and trimellitates, such as trioctyl trimellitate. See Encyclopedia of Polymer Science and Technology, Volume 14 (1971) at pages 396–397, which are hereby incorporated by reference.

The amount of plasticizer can be about 10 to about 40 weight percent of the aqueous coating composition on a total solids basis, and is more preferably about 20 to about 30 weight percent.

The aqueous coating composition of the present invention also comprises one or more elastomeric polymers. As used herein, "elastomeric polymer" is a polymer which is capable of recovery from large deformations quickly and forcibly and has the ability to be stretched to at least twice its original length and to retract very rapidly to approximately its original length when released. See *Hawley's* at page 455 and *Kirk-Othmer,* Volume 7 (1965) at page 676, which are hereby incorporated by reference.

Suitable elastomeric polymers useful in the present invention for blending with the halogenated vinyl polymer include diolefins, such as polyisoprene, polybutadiene, polychloroprenes (neoprenes), styrene-butadiene copolymers, acrylonitrile-butadiene copolymers and styrene-butadiene-vinylpyridine terpolymers. Other elastomeric polymers useful in the present invention include fluoroelastomers, polysulfides, silicone rubbers, polyacrylates and polyurethanes.

Preferably, the elastomeric polymer is a diolefin such as an acrylonitrile-butadiene copolymer or nitrile rubber. Suitable nitrile rubbers generally contain about 50 to about 82% butadiene. An example of a suitable acrylonitrile-butadiene copolymer is HYCAR G-17, which is commercially available from B. F. Goodrich Chemical Co. of Cleveland, Ohio.

Polyisoprene is the main component of natural rubber. Suitable synthetic polyisoprene is commercially available from Shell Chemical Co. of Houston, Tex. Polybutadiene useful in the present invention generally has about 92 to about 97% cis-1,4-polybutadiene. Suitable chloroprenes (neoprenes) are emulsion polymers of 2-chloro-1,3-butadiene. Suitable styrene-butadiene copolymers generally contain about 71 to about 77% butadiene.

Suitable fluoroelastomers are rubbers containing fluorine, hydrogen and carbon, such as copolymers of vinylidene fluoride and chlorotrifluoroethylene (which are commercially available as Kel-F elastomers from Minnesota Mining and Manufacturing Co. (3M) of Minnesota) and copolymers of perfluoropropylene and vinylidene fluoride (which are commercially available from as VITON copolymers from E.I. duPont de Nemours & Co., Inc. of Wilmington, Del. and FLUOREL copolymers from 3M). Other useful fluoroelastomers include fluoroacrylates, fluoropolyesters, fluorinated silicones and fluorinated nitroso elastomers.

Useful polysulfides include NOVOPLAS polysulfides which are commercially available from ICI Americas, Inc. of Wilmington, Del.

Suitable polyacrylate elastomers are copolymers of alkyl acrylic acid esters, such as ethyl and butyl acrylates, and a crosslinking copolymer, such as acrylonitrile or a chlorinated vinyl derivative.

Suitable silicone rubbers are siloxane polymers composed of a central chain of alternating silicon and oxygen atoms with alkyl or aryl groups attached to the silicon atoms.

Suitable polyurethane elastomers can be formed by the condensation reaction of polyfunctional isocyanate-containing materials with linear polyesters or polyethers containing hydroxyl groups (polyols). Useful polyfunctional isocyanate-containing materials are difunctional isocyanates such as toluene diisocyanate, phenylene diisocyanate, dianisidine diisocyanate, diisocyanatodiphenyl methane, bis(p-phenyl isocyanate), bis(p-phenyl) methylene diisocyanate, bis(p-phenyl cyclohexyl) methylene diisocyanate, naphthalene diisocyanate, xylylene diisocyanate, tetramethylxylylene diisocyanate, cyclohexane diisocyanate, hexamethylene diisocyanate, isophorone diisocyanate and dicyclohexylmethane-4,4'diisocyanate. Useful linear polyesters containing hydroxyl groups can be formed by the reaction of ethylene or propylene glycol with adipic acid. Useful polyethers include polyoxy-1,4-butylene glycol, polyoxy-1,2-propylene glycol and polytetramethylene ether glycol.

A non-limiting example of a suitable polyurethane elastomer is ESTANE, which is commercially available from B.F. Goodrich.

Methods for forming suitable elastomeric polymers are well known to those skilled in the art and further discussion thereof is not believed to be necessary in view of the present disclosure. If more information is needed, see *Kirk-Othmer*, Volume 7 (1965) at pages 679–686 and 693–698 and Volume 17 (1968) at pages 543–544; *Encyclopedia of Polymer Science and Technology*, Volume 2 (1965) at pages 703–706 and *Hawley's* at page 942, which are hereby incorporated by reference.

The halogenated vinyl polymer and elastomeric polymer can be blended by conventional blending equipment such as a mixer. The ratio of halogenated vinyl polymer to elastomeric polymer in the blend can be about 5:95 to about 99:1 based upon the weight of total solids of the blend, is preferably about 50:50 to about 95:5 and is more preferably about 70:30 to about 90:10.

A non-limiting example of a preferred commercially available blend of a halogenated vinyl polymer and an elastomeric polymer is VYCAR™ 552 vinyl chloride copolymer and acrylonitrile-butadiene copolymer polyblend emulsion which is commercially available from B.F. Goodrich and has a glass transition temperature of about 4° C., specific gravity of about 1.09, pH of about 10.3, a surface tension of about 36 dynes per centimeter, a Brookfield viscosity of about 17 centipoise at 25° C. using a Spindle No.1 at 60 rpm, about 55 weight percent average total solids and which includes an anionic emulsifier. See "VYCAR™ Polyvinyl Chloride Emulsions" at page 15 and "Technical Data VYCAR™ 552", a Technical Bulletin of B.F. Goodrich (August 1994), which is hereby incorporated by reference.

The blend preferably has a glass transition temperature greater than zero ° C. as measured using a Differential Scanning Calorimeter (DSC), for example a Perkin Elmer Series 7 Differential Scanning Calorimeter, using a temperature range of about −55° C. to about 150° C. and a scanning rate of about 20° C. per minute.

As used herein, "essentially free of monoolefinic materials" means that the blend preferably contains less than about 5 weight percent and more preferably less than about 1 weight percent of a monoolefinic material (an unsaturated aliphatic hydrocarbon having one double bond. See *Hawley's* at pages 851–852, which are hereby incorporated by reference). Examples of such monoolefinic materials include alkenes, such as ethylene and propylene. Most preferably, the blend is free of a monoolefinic material.

Based upon the weight of the total solids of the aqueous coating composition, the blend of the halogenated vinyl polymer and the elastomeric polymer generally comprises about 50 to 100 weight percent of the aqueous coating composition, preferably comprises about 70 to 100 weight percent, and more preferably about 80 to 100 weight percent of the aqueous coating composition.

The aqueous coating composition can further comprise one or more thermoplastic film-forming materials chemically different from the components discussed above. Examples of suitable thermoplastic film-forming materials include acrylic polymers, polyolefins, thermoplastic polyesters, thermoplastic vinyl polymers and mixtures thereof, to name a few.

Suitable acrylic polymer(s) can be homopolymers, copolymers or multipolymers and can be the addition polymerization products of one or more monomer components comprising one or more acrylic monomers, polymers and/or derivatives thereof (hereinafter "acrylic(s)"). A curable acrylic polymer and the halogenated vinyl polymer component can be present as a copolymer.

Useful acrylic monomers for forming the acrylic polymer include acrylic acid, methacrylic acid, esters of acrylic acid and methacrylic acid, such as acrylates and methacrylates, acrylamides, acrylonitriles and derivatives and mixtures thereof. Useful acrylics can have hydroxy and/or epoxy functionality.

Useful esters of acrylic or methacrylic acid include straight chain or branched alkyl or hydroxyalkyl esters of acrylic or methacrylic acid. Useful alkyl esters can contain about 1 to about 24 carbon atoms, and preferably contain about 1 to about 18 carbon atoms. Non-limiting examples of useful alkyl esters include methyl (meth)acrylate, ethyl (meth)acrylates, propyl (meth)acrylates, butyl (meth)acrylates, pentyl (meth)acrylates, hexyl (meth)acrylates, heptyl (meth)acrylates, octyl (meth)acrylates, nonyl (meth)acrylates, decyl (meth)acrylates, dodecyl (meth)acrylates, tetradecyl (meth)acrylates, hexadecyl (meth)acrylates, ethylhexyl (meth)acrylates, lauryl (meth)acrylates, stearyl (meth)acrylates and 2-ethylhexyl (meth)acrylate. Suitable hydroxyalkyl esters include 2-hydroxyethyl (meth)acrylate, 2-hydroxypropyl (meth)acrylate, 3-hydroxypropyl (meth)acrylate and hydroxybutyl (meth)acrylate.

Non-limiting examples of other useful acrylic monomers include glycol acrylates such as ethylene glycol diacrylate, propylene glycol diacrylate, 1,3-propanediol acrylate, 1,4-butanediol acrylate, 1,4-butanediol methacrylate, 1,6-hexanediol diacrylate, neopentyl glycol diacrylate, 1,3-butyleneglycol diacrylate and tetraethylene glycol diacrylate. A useful polyol acrylate is trimethylolpropane triacrylate. Useful epoxy functional acrylates include polyglycidyl acrylates and polyglycidyl methacrylates. Non-limiting examples of suitable acrylamides include methacrylamide, methylolacrylamide, and N-substituted derivatives thereof. Non-limiting examples of suitable acrylonitriles include acrylonitrile and methacrylonitrile.

An addition polymerizable monomer or polymer can be polymerized with the acrylic. Non-limiting examples of addition polymerizable monomers which can be reacted with the acrylic include other vinyl monomers such as vinyl aromatics including styrene, vinyl toluene, alpha methyl styrene, halostyrenes such as chlorostyrene, and vinyl napthalene; dienes including butadienes such as 1,3-butadiene and 2,3-dimethyl-1,3-butadiene; isoprene; and chloroprene; vinyl acetates, block and graft copolymers thereof. Other useful addition polymerizable monomers include amides, such as n-methylol (meth)acrylamide; nitriles; pyrrolidones and olefins such as ethylene. Mixtures of any of the above addition polymerizable monomers are also useful. Preformed polymers of these monomers can also be addition polymerized with the acrylic polymer provided the preformed polymer has addition polymerizable unsaturation.

Methods for polymerizing acrylic monomers with themselves and/or other addition polymerizable monomers and preformed polymers are well known to those skilled in the art of polymers and further discussion thereof is not believed to be necessary in view of the present disclosure. If additional information is needed, such acrylics and polymerization methods are disclosed in Kirk-Othmer, Vol. 1 (1963) at pages 203–205, 259–297 and 305–307, which are hereby incorporated by reference.

The number average molecular weight (Mn), as determined by gel permeation chromatography of the acrylic polymer, can be about 200 to about 200,000 and is preferably about 30,000 to about 100,000. The glass transition temperature of the acrylic polymer can be about −40° C. to about 100° C. and is preferably about zero° C. to about 80° C. as measured using a Differential Scanning Calorimeter (DSC), for example a Perkin Elmer Series 7 Differential Scanning Calorimeter, using a temperature range of about −55° C. to about 150° C. and a scanning rate of about 20° C. per minute.

Preferably, the acrylic polymer is present in an emulsion including an emulsifying agent, suitable examples of which are discussed below. A curable acrylic polymer is preferably self-crosslinking, although external crosslinking agents can be included in the aqueous coating composition for crosslinking a curable acrylic polymer with itself or other components of the aqueous coating composition, as discussed below. The curable acrylic polymer can be cationic, anionic or nonionic, but preferably is anionic or nonionic.

Non-limiting examples of useful acrylic polymers include FULATEX® materials which are commercially available from H. B. Fuller Co. of St. Paul, Minn. Useful FULATEX® materials include FULATEX® PN-3716G, a butyl acrylate and styrene copolymer and FULATEX® PN-3716L1, a butyl acrylate, styrene and butyl methyl acrylate copolymer. See PN-3716-K and PN-3716-L1 Technical Data Sheets of H.B. Fuller Co. (Jul. 25, 1994), which are hereby incorporated by reference. Other useful FULATEX® materials include FULATEX® PN-3716F, FULATEX® PN-3716H, FULATEX® PN-3716J and FULATEX® PN-3716K.

Other useful curable acrylic polymers include self-crosslinking acrylic emulsions such as RHOPLEX® E-32, E-693, HA-8, HA-12, HA-16, TR-407 and WL-81 emulsions commercially available from the Rohm & Haas Company. See "Building Better Nonwovens", a Technical Bulletin of Rohm and Haas Specialty Industrial Polymers, (1994), which is hereby incorporated by reference. Also useful are the CARBOSET acrylic polymers which are commercially available from B.F. Goodrich Co. of Toledo, Ohio.

Useful acrylic polymers include copolymers of acrylic monomers with vinyl compounds such as n-methylolacrylamide vinyl acetate copolymers and VINOL® vinyl acetate products which are commercially available from Air Products and Chemicals, Inc. of Allentown, Pa.

Yet another suitable acrylic are ethylene acrylic acid copolymers such as MICHEM® PRIME 4990 or MICHEM® PRIME 4983HS, which are commercially available from Michelman Inc. of Cincinnati, Ohio.

The acrylic polymer and halogenated vinyl polymer can be present as a copolymer, as discussed above. Suitable copolymers include VYCAR™ 590X20, 460X46, 450X61, 460X45 and 460X49 polyvinyl chloride-acrylic copolymers which are commercially available from B.F. Goodrich.

The amount of the curable acrylic polymer(s) can be about 1 to about 50 weight percent of the aqueous coating composition on a total solids basis, preferably about 5 to about 40 weight percent, and more preferably about 10 to about 30 weight percent.

As discussed above, other suitable thermoplastic film-forming materials for use in the aqueous coating composition include polyolefins, such as polypropylene and polyethylene materials. For example the polypropylene emulsion RL-5440, which is commercially available from Sybron Chemicals of Birmingham, N.J., and Polyemulsion Chemcor 43C30, which is commercially available from Chemical Corp. of America, is a useful polyolefin. Another example of a suitable polyolefin for use in the present invention is the high density polyethylene emulsion Protolube HD which is commercially available from Sybron Chemicals of Birmingham, N.J.

Thermoplastic polyesters useful in the present invention include ethylene adipates (such as Desmophen 2000) and ethylene butylene adipates (such as Desmophen 2001 KS), both of which are commercially available from Bayer of Pittsburgh, Pa.

Non-limiting examples of useful thermoplastic vinyl polymers include RESYN 2828 and RESYN 1037 vinyl acetate copolymer emulsions which are commercially available from National Starch, and other polyvinyl acetates such as are commercially available from H. B. Fuller and Air Products and Chemicals Co. of Allentown, Pa. Other useful vinyl polymers include polyvinyl pyrrolidones such as PVP K-15, PVP K-30, PVP K-60 and PVP K-90, each of which are commercially available from ISP Chemicals of Wayne, N.J.

As mentioned above, the aqueous coating composition can include one or more aqueous soluble, emulsifiable or dispersible wax materials. The wax material can be selected from vegetable, animal, mineral, synthetic or petroleum waxes, for example. Preferred waxes are petroleum waxes such as MICHEM® LUBE 296 microcrystalline wax, POLYMEKON® SPP-W microcrystalline wax and PETROLITE 75 microcrystalline wax which are commercially available from Michelman Inc. of Cincinnati, Ohio and the Petrolite Corporation of Tulsa, Okla., respectively. Generally, the amount of wax can be about 1 to about 10 weight percent of the aqueous coating composition on a total solids basis, and preferably about 3 to about 5 weight percent.

The aqueous coating composition can include one or more emulsifying agents or surfactants for emulsifying components of the aqueous coating composition, such as the halogenated vinyl polymer. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils.

An example of a suitable polyoxypropylene-polyoxyethylene copolymer is PLURONIC™ F-108, which is commercially available from BASF Corporation of Parsippany, N.J. Examples of useful ethoxylated alkyl phenols include ethoxylated octylphenoxyethanol, phenoxy polyethylene-oxy(ethanol), phenoxy(ethyleneoxy)ethanol and nonyl phenoxy poly(ethyleneoxy)ethanol. An example of a commercially available ethoxylated octylphenoxyethanol is IGEPAL CA-630 from GAF Corporation of Wayne, N.J. An example of a polyoxyethylated vegetable oil is EMULPHOR EL-719, which is commercially available from GAF Corp. A useful polyoxyethylene octylphenyl glycol ether is Triton X-100, which is commercially available from Rohm & Haas of Philadelphia, Pa. Tween 21 and 81, which are available from ICI Americas of Wilmington, Del., and TMAZ 81, which is available from PPG Industries, Inc., are examples of useful ethylene oxide derivatives of sorbitol esters. Other suitable emulsifying agents include NOVEPOX™ or Prox E 117 non-ionic epoxide polyols, which are commercially available from Synthron, Inc.

Generally, the amount of emulsifying agent can be about 0.01 to about 20 weight percent of the aqueous coating composition on a total solids basis, and is more preferably about 0.1 to about 10 weight percent.

Anti-foaming materials and chlorine-removing catalysts can also be included in the aqueous coating composition discussed above. Suitable anti-foaming materials are the SAG materials which are commercially available from OSi Specialties, Inc. of Danbury, Conn. and MAZU DF-1 36 which is available from PPG Industries, Inc. A non-limiting example of a suitable catalyst for removing chlorine from the aqueous secondary coating composition is urea. The amount of anti-foaming materials and chlorine-removing catalysts can be about $1 \times 10^{-4}$ to about 5 weight percent of the aqueous coating composition on a total solids basis.

Water (preferably deionized) is included in the aqueous coating composition in an amount sufficient to facilitate application of a generally uniform coating upon the fibers of the strand. The weight percentage of solids of the aqueous coating composition generally can be about 5 to about 50 weight percent. Preferably, the weight percentage of solids is about 10 to about 30 weight percent and, more preferably, about 20 to about 30 weight percent.

In a preferred embodiment, the aqueous coating composition of the principal layer consists of VYCAR™ 552 vinyl chloride copolymer and acrylonitrile-butadiene copolymer polyblend emulsion and water. In an alternative preferred embodiment, the aqueous coating composition of the principal layer consists of VYCAR™ 552 vinyl chloride copolymer and acrylonitrile-butadiene copolymer polyblend emulsion, polyurethane and water.

The aqueous coating composition of the present invention can be prepared by any suitable method such as conventional mixing well known to those skilled in the art. Preferably the components discussed above are mixed together and the mixture is diluted with water to have the desired weight percent solids.

The application of an aqueous coating composition as a principal layer to one or more fiber strand(s) will now be discussed generally. In the preferred embodiment shown in FIG. 1, the principal layer 16 of the aqueous coating composition is applied as a tertiary coating over an essentially dried residue of a secondary coating of the base coating composition. The base coating composition is preferably aqueous-based and can include film-formers such as thermoplastic materials, lubricants, coupling agents, plasticizers, waxes and emulsifiers, such as are discussed above.

Examples of suitable thermoplastic film-forming materials for use in the base coating composition include acrylic polymers, polyamides, polyolefins, polyesters, polyurethanes, vinyl polymers and mixtures thereof, to name a few. Suitable acrylic polymers, polyolefins, thermoplastic polyesters, thermoplastic vinyl polymers are discussed in detail above.

Suitable thermoplastic polyurethanes are condensation products of a polyisocyanate material and a hydroxyl-containing material such as polyol and include, for example, Witcobond® W-290H which is commercially available from Witco Chemical Corp. of Chicago, Ill. and Ruco 2011 L which is commercially available from Ruco Polymer Corp. of Hicksville, N.Y. Suitable thermosetting polyurethanes include Baybond XW-110, which is commercially available from Bayer and other thermosetting polyurethanes which are commercially available from Bayer and E.I. duPont de Nemours Co. of Wilmington, Del. Preferably, the base coating composition is essentially free of polyurethanes, i.e., it contains less than about 5 weight percent polyurethanes on a total solids basis, and more preferably is free of polyurethanes.

Preferably, the base coating composition comprises one or more acrylic polymers and one or more wax materials, such as are discussed above. More preferably, the base coating composition comprises about 90 weight percent of RHOPLEX® E-32 acrylic polymer and about 10 weight percent of PETROLITE 75 microcrystalline wax on a total solids basis.

In an alternative embodiment, the base coating composition includes one or more first polymers and one or more second polymers such as are discussed below.

The first polymer can be prepared by vinyl addition polymerization of a first monomer component comprising a first vinyl aromatic monomer(s) and an acrylic monomer(s). Non-limiting examples of suitable first vinyl aromatic monomers for preparing the first polymer include vinylbenzene, divinylbenzene, vinyl toluene, alpha methyl styrene, halostyrenes such as chlorostyrene, and mixtures thereof. Suitable first acrylic monomer(s) for preparing the first polymer include acrylic acid, methacrylic acid, esters of acrylic acid and methacrylic acid, such as acrylates and methacrylates, including epoxy functional (meth)acrylates, acrylic anhydrides, acrylamides, acrylonitriles and derivatives and mixtures thereof. See *Kirk-Othmer Encyclopedia of Chemical Technology,* Vol. 1 (1963) at page 285, which is hereby incorporated by reference. The first vinyl aromatic monomer and/or first acrylic monomer can also be addition polymerized with other addition polymerizable monomers or polymers such as dienes, vinyl halides, vinyl acetates, block and graft copolymers thereof, amides, nitriles, pyrrolidones and olefins such as ethylene. Mixtures of any of the above addition polymerizable monomers are also useful.

Non-limiting examples of commercially available first polymers include FULATEX® PN-3716K, FULATEX® PN-3716G styrene-acrylic copolymer and FULATEX® PN-3716L1 styrene-acrylic copolymer. See PN-3716-K and PN-3716-L1 Technical Data Sheets of H.B. Fuller Co. (Jul. 25, 1994), which are hereby incorporated by reference. Self-crosslinking styrene-acrylic copolymer emulsions useful in the present invention include RHOPLEX® GL-618, RHOPLEX® NW-1845 and RHOPLEX® NW-1715. See "Building Better Nonwovens", a Technical Bulletin of Rohm and Haas Specialty Industrial Polymers (1994), which is hereby incorporated by reference. Other examples of useful first polymers include acrylontrile-butadiene-styrene terpolymers (ABS) and styrene-acrylonitrile copolymers (SAN).

If present, the amount of first polymer is generally about 5 to about 99 weight percent of the base coating composition on a total solids basis.

The second polymer can be prepared by vinyl addition polymerization of a second monomer component comprising a polymer of a second vinyl aromatic monomer, however the second polymer must be different from the first polymer. For example, the second polymer can be polymerized from a different vinyl aromatic monomer or a different addition polymerizable monomer.

The second polymer can be a homopolymer, copolymer or multipolymer and can be an addition polymerization product of a monomer component comprising a vinyl aromatic monomer, polymer and/or derivatives thereof (hereinafter "vinyl aromatic(s)"). The vinyl aromatic of the second polymer can be addition polymerized with another addition polymerizable monomer or polymer, as discussed below. Non-limiting examples of suitable vinyl aromatic monomers include vinylbenzene, divinylbenzene, vinyl toluene, alpha methyl styrene, halostyrenes such as chlorostyrene, and mixtures thereof. Non-limiting examples of addition polymerizable monomers or polymers include ethylenically unsaturated monomers including vinyl monomers and polymers such as are discussed above, and also include acrylics such as are discussed above.

Non-limiting examples of commercially available polymers which can be used as the second polymer include the ROVENE® family of self-crosslinking and crosslinkable styrene-butadiene emulsions which are commercially available from Rohm and Haas Company of Philadelphia, Pa., such as ROVENE® 5550, ROVENE® 4170, ROVENE® 4402 and ROVENE® 4106. "ROVENE® 5550", a Technical Bulletin of Rohm and Haas Company Specialty Polymers (February 1994) and "Building Better Nonwovens", page 7, a Technical Bulletin of Rohm and Haas Company Specialty Polymers (1994), each of which are hereby incorporated by reference.

Thermoplastic elastomeric materials useful as second polymers in the present invention also include styrene-acrylontrile (SAN) copolymers such as LUSTRAN, which is commercially available from Monsanto of St. Louis, Mo., styrene-butadiene-styrene (SBS) copolymers and acrylonitrile-butadiene-styrene (ABS) copolymers, such as CYCOLAC or BLENDEX, which are commercially available from GE Plastics of Pittsfield, Ma.

The amount of second polymer is preferably about 1 to about 20 weight percent of the alternative embodiment of the base coating composition on a total solids basis.

Preferably, the alternative embodiment of the base coating composition includes RHOPLEX® NW-1715 as the first polymer and ROVENE® 5550, FULATEX® PN-3716-L1 or FULATEX® PN-3716-G as the second polymer.

The base coating composition can also comprise one or more fiber lubricants. Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom ), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as EMERY® 6717, a partially amidated polyethylene imine commercially available from Henkel Corporation of Kankakee, Ill. and Alubraspin 226, which is commercially available from PPG Industries, Inc.

Useful alkyl imidazoline derivatives are CATION X, which is commercially available from Rhone Poulenc of Alubreton, N.J. and Alubraspin 261, which is available from PPG Industries, Inc. Other useful lubricants include Alubraspin 227 silylated polyamine polymer lubricant which is manufactured by PPG Industries, Inc., RD-1 135B epoxidized polyester which is commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and PROTOLUBE HD high density polyethylene emulsion which is commercially available from Sybron Chemicals of Birmingham, N.J.

In the preferred embodiment, the base coating composition is applied as a secondary coating over an essentially dried residue of a sizing composition which is present on at least a portion of surfaces of the fibers to protect the surfaces from abrasion during processing. As used herein, the terms "size", "sized" or "sizing" refer to the composition applied to the fibers immediately after formation of the fibers.

When used as a secondary coating, the base coating composition is different from the sizing composition, i.e., the base coating composition (1) contains at least one component which is chemically different from the components of the sizing composition; or (2) contains at least one component in an amount which is different from the amount of the same component contained in the sizing composition. For example, the base coating composition can contain an acrylic polymer and the sizing composition can contain a chemically different polyoxyalkylene polyol. In another example, the base coating composition and sizing composition can each contain the same chemical component but in different amounts.

Suitable components for the sizing composition will now be discussed. Preferably the sizing composition is aqueous-based and can include film-formers such as thermosetting materials and thermoplastic materials; lubricants; coupling agents; waxes; emulsifiers and water as components, to name a few. Non-limiting examples of suitable sizing compositions are disclosed in K. Loewenstein, *The Manufacturing Technology of Continuous Glass Fibres*, (3d Ed. 1993) at pages 237–289.

A preferred sizing composition includes about 78 weight percent PLURACOL V-10 polyoxyalkylene polyol (commercially available from BASF Wyandotte of Michigan); about 8 weight percent EMERY 6717 partially amidated polyethylene imine lubricant (commercially available from Henkel Corporation of Kankakee, Ill.) and about 14 weight percent A-1108 aminosilane (commercially available from OSi Specialties, inc. of Danbury Conn.).

Examples of suitable thermoplastic and thermosetting film-forming materials for use in the sizing composition include acrylic polymers, alkyds, polyepoxides, phenolics, polyamides, polyolefins, polyesters, polyurethanes, vinyl polymers and mixtures thereof, such as are discussed above.

Fiber lubricants useful in the sizing composition include cationic, non-ionic or anionic lubricants and mixtures thereof, such as are discussed above. Generally, the amount of fiber lubricant can be about 1 to about 15 weight percent of the sizing composition on a total solids basis, preferably about 3 to about 12 weight percent, and more preferably about 5 to about 10 weight percent.

The sizing composition can further comprise one or more coupling agents such as organo silane coupling agents, transition metal coupling agents, amino-containing Werner coupling agents and mixtures thereof. These coupling agents typically have dual functionality. Each metal or silicon atom has attached to it one or more groups which can react or compatibilize with the fiber surface and/or the components of the aqueous secondary coating composition. As used herein, the term "compatibilize" means that the groups are chemically attracted, but not bonded, to the fiber surface and/or the components of the sizing composition, for example by polar, wetting or solvation forces. Examples of hydrolyzable groups include:

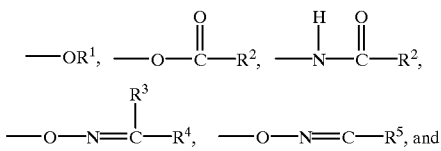

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of useful functional organo silane coupling agents include 3-aminopropyidimethylethoxysilane, gamma-aminopropyl-triethoxysilane, gamma-aminopropyltrimethoxysilane, beta-aminoethyl-triethoxysilane, N-beta-aminoethyl-aminopropyltrimethoxysilane, gamma-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, ureidopropyltrimethoxysilane, ureidopropyltriethoxysilane, chloropropyltrimethoxysilane, and chloropropyltriethoxysilane.

Preferred functional organo silane coupling agents include amino silane coupling agents, such as A-1100 and A-1108, each of which are commercially available from OSi Specialties, Inc. of Tarrytown, N.Y. The organo silane coupling agent can be at least partially hydrolyzed with water prior to application to the fibers, preferably at about a 1:1 stoichiometric ratio or, if desired, applied in unhydrolyzed form.

The amount of coupling agent can be 1 to about 5 weight percent of the sizing composition on a total solids basis, and is preferably about 2 to about 3 weight percent.

The sizing composition can further comprise one or more organic acids in an amount sufficient to provide the sizing composition with a pH of about 4 to about 6. Suitable organic acids include mono- and polycarboxylic acids and/or anhydrides thereof, such as acetic, citric, formic, propionic, caproic, lactic, benzoic, pyruvic, oxalic, maleic, fumaric, acrylic, methacrylic acids and mixtures thereof, which are well known to those skilled in the art and are commercially available.

The sizing composition can also include other components such as crosslinking agents, emulsifiers and waxes discussed above. The amounts of such components used in the sizing composition are similar to the amounts set forth above for the base coating composition and can be determined by a skilled artisan without undue experimentation.

The sublayer 18 of the sizing composition, base layer 14, 114 of the base coating composition and principal layer 16, 116 of the aqueous coating composition are applied to fibers, strands, yarns or the like of natural or man-made materials. Fibers believed to be useful in the present invention and methods for preparing and processing such fibers are discussed at length in the *Encyclopedia of Polymer Science and Technology*, Vol. 6 (1967) at pages 505–712, which is hereby incorporated by reference.

Suitable natural fibers include those derived directly from animal, vegetable and mineral sources. Suitable natural inorganic fibers include glass and polycrystalline fibers, such as ceramics including silicon carbide, and carbon or graphite.

The preferred fibers for use in the present invention are glass fibers, a class of fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Preferred glass fibers are formed from E-glass. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, "The Manufacturing Technology of Glass Fibres", (3d Ed. 1993) at pages 30–44, 47–60, 115–122 and 126–135, which are hereby incorporated by reference.

Non-limiting examples of suitable animal and vegetable-derived natural fibers include cotton, cellulose, natural rubber, flax, ramie, hemp, sisal and wool. Suitable man-made fibers can be formed from a fibrous or fiberizable material prepared from natural organic polymers, synthetic organic polymers or inorganic substances. As used herein, the term "fiberizable" means a material capable of being formed into a generally continuous filament, fiber, strand or yarn.

Suitable man-made fibers include those produced from natural organic polymers (regenerated or derivative) or from synthetic polymers such as polyamides, polyesters, acrylics, polyolefins, polyurethanes, vinyl polymers, derivatives and mixtures thereof.

Non-limiting examples of useful polyamide fibers include nylon fibers such as are commercially available from E.l. duPont de Nemours and Company of Wilmington, Del., polyhexamethylene adipamide, polyamide-imides and aramids such as KEVLAR™, which is commercially available from duPont.

Thermoplastic polyester fibers useful in the present invention include those formed from polyethylene terephthalate (for example DACRON™ which is commercially available from duPont and FORTREL™ which is commercially available from Hoechst Celanese Corp. of Summit, N.J.) and polybutylene terephthalate. FIRESTONE 3401 polyester fiber, which is commercially available from Firestone of Akron, Ohio, is a preferred fiber for use in the present invention.

Fibers formed from acrylic polymers believed to be useful in the present invention include polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. A non-limiting example of a suitable acrylic polymer fiber is ORLON™, which is commercially available from duPont.

Useful polyolefin fibers are generally composed of at least 85% by weight of ethylene, propylene, or other olefins.

Fibers formed from vinyl polymers believed to be useful in the present invention can be formed from polyvinyl chloride, polyvinylidene chloride (such as SARAN™, which is commercially available from Dow Plastics of Midland, Mich.), polytetrafluoroethylene, and polyvinyl alcohol (such as VINYLON™, a polyvinyl alcohol fiber which has been crosslinked with formaldehyde).

Further examples of fiberizable materials believed to be useful in the present invention are fiberizable polyimides, polyether sulfones, polyphenyl sulfones; polyetherketones, polyphenylene oxides, polyphenylene sulfides, polyacetals, synthetic rubbers or spandex polyurethanes such as LYCRA™, which is available from duPont.

It is understood that blends or copolymers of any of the above materials and combinations of fibers formed from any of the above materials can be used in the present invention, if desired.

The present invention will now be discussed generally in the context of glass fiber strands. However, one of ordinary skill in the art would understand that the sizing (if present), base and principal coating compositions are useful for coating any of the fibers discussed above.

Suitable apparatus and methods for processing glass fiber strands will be discussed below. For further information, see *Loewenstein* (3d Ed.) at pages 165–172 and 219–222, which are hereby incorporated by reference.

The sublayer 18 of sizing (if present) or base coating composition 14, 114 (if present as a sizing as in the alternative embodiment of FIG. 2) can be applied in many ways, for example by contacting the filaments with a static or dynamic applicator, such as a roller or belt applicator, spraying or other means. The sized fibers are preferably dried at room temperature or at elevated temperatures. The dryer removes excess moisture from the fibers and, if present, cures any curable sizing or secondary coating composition components. The temperature and time for drying the glass fibers will depend upon such variables as the percentage of solids in the sizing composition, components of the sizing composition and type of glass fiber. For example, the forming package can be dried in an oven at a temperature of about 104° C. (220° F.) to about 160° C. (320° F.) for about 10 to about 24 hours to produce glass fiber strands having a dried residue of the composition thereon. The sizing composition is typically present on the fibers in an amount between about 0.1 percent and about 5 percent by weight after drying.

In the preferred embodiment, the fibers are gathered into strands and the base layer 14 of the base coating composition is applied as a secondary coating over the sublayer 18 in an amount effective to coat or impregnate the portion of the strands. In the alternative embodiment, the principal layer 116 is applied as a secondary coating over the base layer 114. The secondary coating can be conventionally applied by dipping the strand in a bath containing the composition, by spraying the secondary coating upon the strand or by contacting the strand with a static or dynamic applicator such as a roller or belt applicator, for example. The coated strand can be passed through a die to remove excess coating composition from the strand and/or dried as discussed above for a time sufficient to at least partially dry or cure the secondary coating. The method and apparatus for applying the secondary coating to the strand is determined in part by the configuration of the strand material.

Preferably, the secondary coating is applied to the strands by passing the strands through a bath or dip of the secondary coating and exposing the fibers to elevated temperatures for a time sufficient to at least partially dry or cure the secondary coating. The strand can be "opened up" just before entering the secondary coating bath by passing it over a bar or other spreading device which acts to separate the individual fibers from one another. This spreading of the fibers from one another results in a more thorough impregnation of the strand with the composition. Preferably, a die is used to remove excess coating.

The strand is preferably dried after application of the secondary coating in a manner well known in the art. For example, the coated strand can be at least partially dried in air at room temperature (about 25° C.) or alternatively in a furnace or oven, preferably above 232° C. (450° F.), to speed the curing process and evaporate the water. A particularly suitable dryer is what disclosed in U.S. Pat. No. 5,197,202, which is hereby incorporated by reference.

In the preferred embodiment, the principal layer 16 of the aqueous coating composition is applied as a tertiary coating to at least a portion of the secondary base coating, i.e., such a fiber strand would have a sublayer 18 of sizing, a secondary base layer 14 of the base coating composition and a tertiary, outer principal layer 16 of the aqueous coating composition. The tertiary coating of the principal layer 16 can be applied before or preferably after the strand is fabricated into an assembly of a fabric, mat or woven material, for example by dipping individual strands or an assembly of the strands into a bath of the aqueous coating composition or by spraying the aqueous coating composition thereon.

The average diameter of the coated strand is preferably about 0.25 millimeters (about 0.010 inches) to about 3.05 millimeters (about 0.120 inches), and more preferably about 0.51 millimeters (about 0.020 inches) to about 2.03 millimeters (about 0.08 inches).

The fiber strands discussed above can be used in a wide variety of applications, but preferably are used as reinforcements for geosynthetic materials or polymeric matrix materials, such as polymeric thermoplastic materials and polymeric thermosetting materials.

As used herein, "geosynthetic material" means reinforcements for earthen structures such as soil stabilization, support for earthworks, erosion barriers, retaining walls and pond liners, which can but preferably does not include building or roadway construction materials such as asphalt. Geosynthetic materials include geotextiles (woven or non woven fabric-like materials generally for separation/reinforcement); geogrids; geomembranes; geosynthetic clay liners; erosion control products; and specialty geosynthetics.

Figure 3:
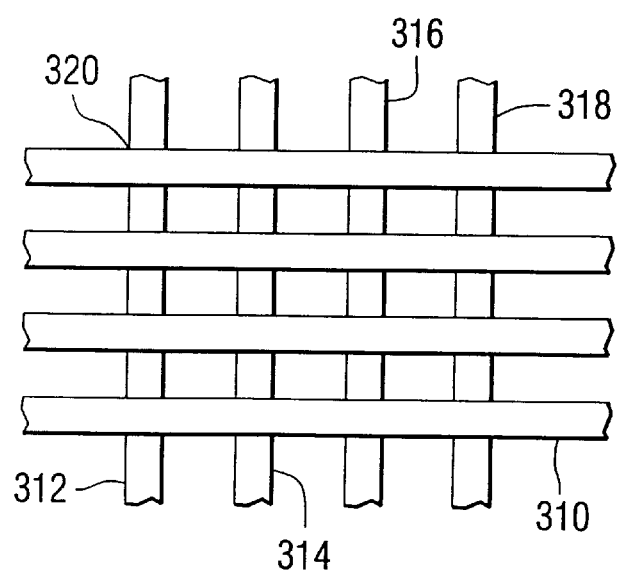
FIG. 3 is a front elevational view of a reinforcement nonwoven material including fiber strands according to the present invention.

A geosynthetic material can be formed from one or more of the fiber strands of the present invention, alone or in combination with strands comprising fibers formed from natural and/or thermoplastic materials such as are discussed below. Such geosynthetic materials can be in the form of chopped or continuous strands, mats, fabrics, grids or combinations thereof. For example, a preferred geosynthetic nonwoven material 310 shown in FIG. 3 comprises a first layer 312 of a plurality of generally parallel, spaced apart fiber strands 314 and an adjacent second layer 316 comprising a plurality of generally parallel, spaced apart fiber strands 318. The strands 314 of the first layer 312 are positioned to form a plurality of intersections 320 with the strands 318 of the second layer 316.

Figure 4:
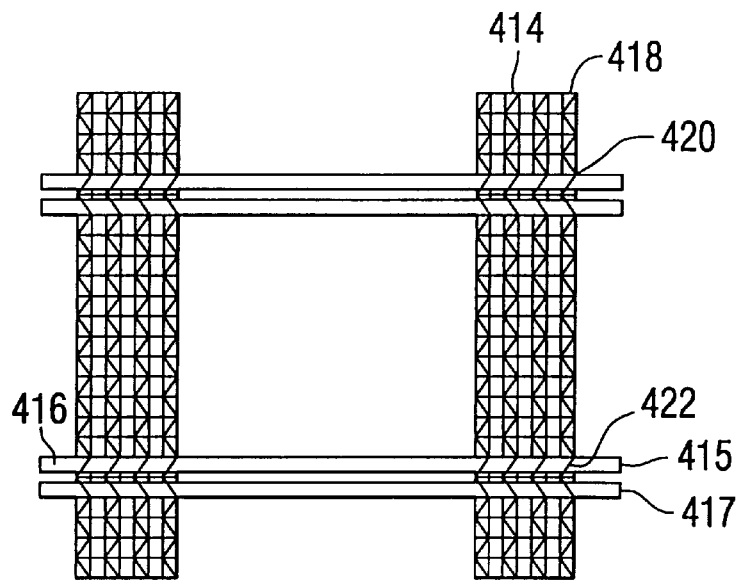
FIG. 4 is a front elevational view of a reinforcement knit fabric according to the present invention.

As shown in FIG. 4, the intersecting strands 414, 418 and/or adjacent warp strands 415, 417 can be connected by an organic tying member 422, such as an organic fiber strand, if desired. The organic tying member 422 can be formed from one or more organic materials selected from the group consisting of natural materials, thermoplastic materials and combinations thereof. Useful natural materials include, for example, cotton, cellulose, natural rubber and wool. Non-limiting examples of suitable thermoplastic materials for forming the organic fiber tying member 422 include polyolefins, polyamides, thermoplastic polyurethanes, thermoplastic polyesters, acrylic polymers, vinyl polymers, acetals, polyaryl sulfones, polyether sulfones, polyimides, polyetherketones, polyphenylene oxides, polyphenylene sulfides and combinations thereof.

The intersecting strands 314, 318, 414, 418 can be coated with the principal layer 316, 416 of the aqueous coating composition prior to or preferably subsequently to assembly into the geosynthetic material. When the aqueous coating composition is applied as a bonding agent to one or more intersections 320, 420 of the first layer 312, 412 of strands 314, 414 with the second layer 316, 416 of strands 318, 418 subsequently to assembly of the geosynthetic material, the dried residue of the aqueous coating composition provides a flexible bond between the intersecting strands 314, 318, 414, 418 which facilitates installation and decreases physical deterioration by mechanical wear of the geosynthetic material. Alternatively, the components of the aqueous coating composition can be applied to the intersections neat or in a dried form and heated to bond the intersecting strands.

In the alternative embodiment shown in FIG. 4, the geosynthetic material can be fabricated using a conventional tricot-type knitting machine such as Model No. COPCENTRA HS-2/ST which is commercially available from Liba of Germany. Any type of stitching or knitting arrangement can be used, such as chain loops, tricot loops or the like.

The geosynthetic materials of the present invention are useful for reinforcing a wide variety of soil materials in many engineering applications. As used herein, "soil material" means earthen material comprising one or more of the following components: inorganic mineral soils, organic materials, landfill materials and metallic waste materials. Soil material preferably does not include asphalt or concrete materials.

Suitable inorganic mineral soils are selected from the group consisting of gravel, sand, silt, clay and mixtures thereof. Generally, the mineral soil can comprise about 25 to 100 weight percent of the soil material on a basis of total weight of the soil material. In a preferred embodiment, the soil material comprises one or more organic materials, such as organic materials which were naturally deposited during formation of the inorganic mineral soil. Non-limiting examples of such organic materials include one or more of the following: decomposing animal and vegetative matter, sewer spill off, oil products and derivatives thereof. While not preferred, the soil material can comprise one or more metallic waste materials, for example heavy metals such as chromium or lead. The soil material can also be formed from an aqueous soil mixture is obtained by excavating dredge material from the floor of a body of water, such as a river, lake, channel or preferably from an ocean. Dredge material generally comprises one or more of the mineral soils and water as discussed in detail above. Dredge material preferably also comprises one or more organic materials such as are discussed above.

As discussed above, the coated fiber strands of the present invention are useful for reinforcing thermoplastic or thermosetting polymeric matrices. Non-limiting examples of suitable polymeric thermoplastic matrix materials include polyolefins such as polyethylene, extended-chain polyethylene, polypropylene, polybutene, polyisoprene, and polypentene, polymethyl pentene, polytetrafluoroethylene and neoprene; polyamides, thermoplastic polyurethanes and thermoplastic polyesters such as are discussed above, vinyl polymers such as polyvinyl chloride, polyvinylidene chloride (saran), polyvinyl fluoride, polyvinylidene fluoride, ethylene vinyl acetate copolymers and polystyrenes; derivatives and mixtures thereof.

Thermoplastic elastomeric materials useful as matrix materials in the present invention include styrene-butadiene rubbers, styrene-acrylontrile (SAN) copolymers, styrene-butadiene-styrene (SBS) copolymers and acrylonitrile-butadiene-styrene (ABS) copolymers.

Further examples of useful thermoplastic materials include polyimides, polyether sulfones, polyphenyl sulfones, polyetherketones, polyphenylene oxides, polyphenylene sulfides, polyacetals, polyvinyl chlorides and polycarbonates. Also included as suitable thermoplastic materials are any of the above thermoplastics which are modified by an unsaturated monomer.

Matrix materials useful in the present invention can include thermosetting materials such as thermosetting polyesters, vinyl esters, epoxides (containing at least one epoxy or oxirane group in the molecule, such as polyglycidyl ethers of polyhydric alcohols or thiols), phenolics, aminoplasts, thermosetting polyurethanes, derivatives and mixtures thereof.

Other components which can be included with the polymeric matrix material and reinforcing material in the composite are, for example, colorants or pigments, lubricants or process aids, ultraviolet light (UV) stabilizers, antioxidants, other fillers, and extenders.

The fiber strand reinforcing material can be dispersed in the matrix by hand or any suitable automated feed or mixing device which distributes the reinforcing material generally evenly throughout the polymeric matrix material. For example, the reinforcing material can be dispersed in the polymeric matrix material by dry blending all of the components concurrently or sequentially.

Figure 5:
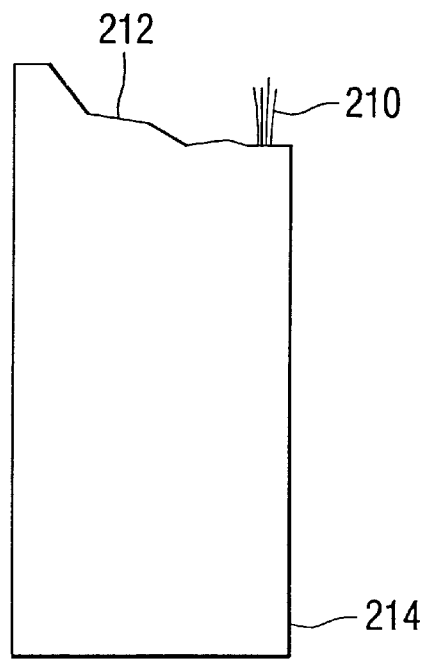
FIG. 5 is a front elevational view of a composite, partially broken away to show a strand according to the present invention.

The polymeric matrix material 210 and strand 212 can be formed into a composite 214, shown in FIG. 5, by a variety of methods which are dependent upon such factors as the type of polymeric matrix material used. Thermosetting polymeric matrix materials can be cured by the inclusion of crosslinkers in the matrix material and/or by the application of heat, for example. Suitable crosslinkers useful to crosslink the polymeric matrix material are discussed above. The temperature and curing time for the thermosetting polymeric matrix material depends upon such factors as the type of polymeric matrix material used, other additives in the matrix system and thickness of the composite, to name a few.

Reinforced polymeric composites can be formed from the polymeric matrix material, reinforcing material and any other desired components in a variety of ways. For example, for a thermosetting matrix material, the composite can be formed by compression or injection molding, pultrusion, filament winding, hand lay-up, spray-up or by sheet molding or bulk molding followed by compression or injection molding. For a thermoplastic matrix material, suitable methods for forming the composite include direct molding or extrusion compounding followed by injection molding. Useful extrusion equipment includes single or twin screw extruders commercially available from Werner Pfleiderer and Welding Engineers, respectively. Methods and apparatus for forming the composite by the above methods is discussed in 1. Rubin, *Handbook of Plastic Materials and Technology* (1990) at pages 955–1062, 1179–1215 and 1225–1271, which are hereby incorporated by reference.

The present invention will now be illustrated by the following specific, non-limiting examples.

EXAMPLE 1

The aqueous sizing composition of Table 1 was applied as a base layer to four strand bundles of H-15 E-glass fibers and the bundles were wound onto individual forming packages and dried as described in a manner similar to that discussed above in the specification. The aqueous sizing composition of Table 1 was prepared according to U.S. Pat. No. 4,390,647.

TABLE 1

| Sizing Component | Weight Percent of Component |
| --- | --- |
| PLURACOL V-10 polyoxyalkylene polyol[1] | 78 |
| EMERY 6717 partially amidated polyethylene imine lubricant[2] | 8 |
| A-1108 aminosilane[3] | 14 |

[1] PLURACOL V-10 polyoxyalkylene polyol is commercially available from BASF Wyandotte of Michigan.
[2] EMERY 6717 partially amidated polyethylene imine lubricant is commercially available from Henkel Corporation of Kankakee, Illinois.
[3] A-1108 aminosilane is commercially available from OSi Specialties, Inc. of Danbury, Connecticut.

The above sized glass fiber strands were coated and impregnated with a principal layer of the aqueous coating composition set forth in Table 2 below having about 40 weight percent solids.

TABLE 2

| Secondary Coating Component | Weight of Component (grams) |
| --- | --- |
| VYCAR ™ 552 polyvinyl chloride/nitrile rubber polyblend[4] | 16,000 |
| MAZU DF-136 defoamer[5] | 15 |
| urea | 18 |
| deionized water | 6000 |

[4] VYCAR ™ 552 polyvinyl chloride/nitrile rubber polyblend is commercially available from B. F. Goodrich of Cleveland, Ohio.
[5] MAZU DF-136 defoamer is available from PPG Industries, Inc.

The aqueous coating composition was applied to the sized glass fibers by drawing the glass fibers through a bath of the coating and a die to remove excess coating, such that the loss on ignition (LOI) of the coated glass strand was about 16.7 percent for the diameter of the passage through the die of about 1.17 millimeters (0.046 inches).

EXAMPLE 2

The aqueous sizing composition of Table 1 was applied to two strand bundles of H-15 E-glass fibers (1600 filaments per strand) and the bundles were wound onto a forming package and dried as described in a manner similar to that discussed above in Example 1. The sized glass fiber strands were coated and impregnated with a base layer of the aqueous coating composition set forth in Table 3.

TABLE 3

| Component | Weight of Component (grams) for Sample |
| --- | --- |
| RHOPLEX ® NW-1715[6] acrylic polymer | 1000 |
| ROVENE ® 5550[7] styrene-butadiene copolymer | 100 |
| PETROLITE 75 microcrystalline wax[8] | 100 |
| Deionized water | 850 |

[6] RHOPLEX NW-1715 acrylic polymer is commercially available from Rohm and Haas Company of Philadelphia, Pennsylvania.
[7] ROVENE ® 5550 self-crosslinking anionic carboxylated styrene butadiene copolymer emulsion is commercially available from Rohm and Haas Company.
[8] PETROLITE 75 microcrystalline wax dispersion is commercially available from the Petrolite Corporation of Tulsa, Oklahoma.

The base layer of the secondary aqueous coating composition was applied to the sized glass fibers by drawing the fibers through a bath of the coating and a die to remove excess coating, such that the loss on ignition (LOI) of the coated glass strand was about 8 to about 12 percent. The diameter of the passage through the die for the samples prepared was about 1.1 millimeters (0.044 inches).

The above secondarily coated glass fiber strands were fabricated as warp and weft strands into a geosynthetic fabric having the configuration shown in FIG. 4 using a Model No. COPCENTRA HS-2/ST tricot-type knitting machine which is commercially available from Liba of Germany. The intersections of the warp and weft strands were knit with polyester tying members.

A sample of the geosynthetic fabric was coated with a principal layer of about 15 to about 20 weight percent on a total solids basis of VYCAR™ 552 polyvinyl chloride/nitrile rubber polyblend (which is commercially available from B.F. Goodrich of Cleveland, Ohio) to form a geosynthetic material. It was observed that the geosynthetic material had good adhesion at the intersections of the warp strands, weft strands and tying members.

From the foregoing description, it can be seen that the present invention provides fiber strands having improved adhesion to a polymeric matrix or improved flexibility for use in a geosynthetic material. The present invention provides a simple, economical reinforcement having one or more of the following performance characteristics: high tensile strength, high modulus of elasticity, resin compatibility, dielectric properties to provide electrical resistance, environmental stability and cost effectiveness.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, I claim:

1. A fiber strand comprising a plurality of fibers having applied to at least a portion of surfaces thereof a base layer of a base coating composition comprising a film-forming material selected from the group consisting of acrylic polymers, thermoplastic polyurethanes, thermoplastic polyesters and mixtures thereof, and thereupon a principal layer of an aqueous coating composition different from the base coating composition, the aqueous coating composition comprising a blend of (1) a halogenated vinyl polymer and (2) an elastomeric polymer, the blend being essentially free of a monoolefinic material.

2. The fiber strand according to claim 1, wherein the fiber strand is formed from a material selected from the group consisting of inorganic materials, natural materials, thermoplastic materials and thermosetting materials.

3. The fiber strand according to claim 2, wherein the fiber strand is formed from an inorganic material which comprises glass fibers.

4. The fiber strand according to claim 2, wherein the fiber strand is formed from a thermoplastic material which comprises polyester fibers. polyesters aditures thereof.

5. The fiber strand according to claim 1, wherein the base coating composition is present as an at least partially dried residue upon the portion of the surface of the fiber strand.

6. The fiber strand according to claim 1, wherein the aqueous coating composition is present as an at least partially dried residue upon the primary layer of the fiber strand.

7. The fiber strand according to claim 1, wherein the halogenated vinyl polymer of the aqueous coating composition is a polymerization reaction product of halogenated vinyl monomers selected from the group consisting of vinyl chloride, vinyl fluoride, vinylidene chloride, vinylidene fluoride and mixtures thereof.

8. The fiber strand according to claim 1, wherein the elastomeric polymer of the aqueous coating composition is selected from the group consisting of polyisoprene, polybutadiene, styrene-butadiene copolymers, acrylonitrile-butadiene copolymers, styrene-butadiene-vinylpyridine terpolymers, fluorinated elastomers, polysulfides, silicone rubbers, polyacrylates and polychloroprenes.

9. The fiber strand according to claim 8, wherein the elastomeric polymer is an acrylonitrile-butadiene copolymer.

10. The fiber strand according to claim 1, wherein the blend of the aqueous coating composition contains less than about 5 weight percent of a monoolefinic material.

11. The fiber strand according to claim 1, wherein the blend of the aqueous coating composition comprises about 50 to 100 weight percent of the aqueous coating composition on a total solids basis.

12. The fiber strand according to claim 1, further comprising a sublayer of a sizing composition positioned upon at least a portion of the surface of the fiber strand adjacent to a side of the base layer opposite the principal layer, such that the base layer is applied over at least a portion of the sublayer.

13. A fiber strand comprising a plurality of fibers having applied to at least a portion of surfaces thereof (1) a sublayer of a sizing composition, (2) thereupon a base layer of a base coating composition different from the sizing composition, the base coating composition comprising a film-forming material selected from the group consisting of acrylic polymers, thermoplastic polyurethanes, thermoplastic polyesters and mixtures thereof, and (3) thereupon a principal layer of an aqueous coating composition different from the base coating composition, the aqueous coating composition comprising a blend of (a) a halogenated vinyl polymer; and (b) an elastomeric polymer.

14. A fiber strand comprising a plurality of fibers having applied to at least a portion of surfaces thereof a base layer of a base coating composition and thereupon a principal layer of an aqueous coating composition different from the base coating composition, the aqueous coating composition comprising a blend of (1) a halogenated vinyl polymer and (2) an elastomeric polymer, the blend being essentially free of a monoolefinic material, wherein the halogenated vinyl polymer of the aqueous coating composition is a polymerization reaction product of halogenated vinyl monomers selected from the group consisting of vinyl chloride, vinyl fluoride, vinylidene chloride, vinylidene fluoride and mixtures thereof.

15. A fiber strand comprising a plurality of fibers having applied to at least a portion of surfaces thereof a base layer of a base coating composition and thereupon a principal layer of an aqueous coating composition different from the base coating composition, the aqueous coating composition comprising a blend of (1) a halogenated vinyl polymer and (2) an elastomeric polymer, the blend being essentially free of a monoolefinic material, wherein the elastomeric polymer of the aqueous coating composition is selected from the group consisting of polyisoprene, polybutadiene, styrene-butadiene copolymers, acrylonitrile-butadiene copolymers, styrene-butadiene-vinylpyridine terpolymers, fluorinated elastomers, polysulfides, silicone rubbers, polyacrylates and polychloroprenes.

16. A fiber strand comprising a plurality of fibers having applied to at least a portion of surfaces thereof a base layer of a base coating composition and thereupon a principal layer of an aqueous coating composition different from the base coating composition, the aqueous coating composition comprising a blend of (1) a halogenated vinyl polymer and (2) an elastomeric polymer, the blend being essentially free of a monoolefinic material, wherein the blend of the aqueous coating composition comprises about 50 to 100 weight percent of the aqueous coating composition on a total solids basis.

* * * * *